(12) United States Patent
Von Schuttenbach et al.

(10) Patent No.: US 12,546,294 B2
(45) Date of Patent: Feb. 10, 2026

(54) WHEEL GENERATOR HAVING A COUPLING SYSTEM

(71) Applicant: KES-TECH-GROUP GMBH, Bahrendorf (DE)

(72) Inventors: Andreas Von Schuttenbach, Ingolstadt (DE); Maik Kraus, Magdeburg (DE)

(73) Assignee: KES-Tech-Group GmbH, Bahrendorf (DE)

( * ) Notice: Subject to any disclaimer, the term of this patent is extended or adjusted under 35 U.S.C. 154(b) by 0 days.

(21) Appl. No.: 18/858,870

(22) PCT Filed: Apr. 18, 2023

(86) PCT No.: PCT/EP2023/059960
§ 371 (c)(1),
(2) Date: Oct. 22, 2024

(87) PCT Pub. No.: WO2023/203001
PCT Pub. Date: Oct. 26, 2023

(65) Prior Publication Data
US 2025/0270983 A1  Aug. 28, 2025

(30) Foreign Application Priority Data
Apr. 22, 2022 (EP) .................... 22169401

(51) Int. Cl.
*F03G 7/08* (2006.01)
*H02K 7/06* (2006.01)
(Continued)

(52) U.S. Cl.
CPC ............... *F03G 7/081* (2021.08); *H02K 7/06* (2013.01); *H02K 7/116* (2013.01); *H02K 7/1846* (2013.01); *F05B 2260/4022* (2013.01)

(58) Field of Classification Search
CPC .......... F03G 7/081; H02K 7/06; H02K 7/116; H02K 7/1846; F05B 2260/4022
See application file for complete search history.

(56) References Cited

U.S. PATENT DOCUMENTS 6,291,901 B1 * 9/2001 Cefo ...................... H02K 35/02
322/3
2004/0130157 A1 7/2004 Naar et al.
(Continued)

FOREIGN PATENT DOCUMENTS

| EP | 3540921 | | 9/2019 | |
| EP | 3540921 A1 * | 9/2019 | ........... H02K 7/1853 |

(Continued)

OTHER PUBLICATIONS

English Translation of International Search Report issued in Int'l Application No. PCT/EP2023/059960, mailed Aug. 1, 2023, 3 pages.

*Primary Examiner* — Viet P Nguyen
(74) *Attorney, Agent, or Firm* — McDonnell Boehnen Hulbert & Berghoff LLP

(57) ABSTRACT

Examples include a wheel generator, namely a converter for obtaining electrical energy in a rolling wheel of a vehicle from the deformation of the wheel tyre due to contact with the road surface, a system for obtaining electrical energy comprising the converter, as well as a vehicle or wheel including the system.

14 Claims, 12 Drawing Sheets

(51) Int. Cl.
*H02K 7/116* (2006.01)
*H02K 7/18* (2006.01)

(56) References Cited

U.S. PATENT DOCUMENTS

2016/0032905 A1\* 2/2016 Klotzer ................... F04B 45/04
    60/516
2024/0102458 A1\* 3/2024 Von Schuttenbach .......................
    F03G 7/081

FOREIGN PATENT DOCUMENTS

| WO | 2015005618 | | 1/2015 | | |
|---|---|---|---|---|---|
| WO | WO-2015005618 | A1 \* | 1/2015 | ............. | F03G 7/081 |
| WO | 2015/054763 | | 4/2015 | | |

\* cited by examiner

WHEEL GENERATOR HAVING A COUPLING SYSTEM

CROSS-REFERENCE TO RELATED APPLICATIONS

This application is a § 371 national stage of international application no. PCT/EP2023/059960, filed on Apr. 18, 2023, which claims priority to European application no. 22169401.1, filed on Apr. 22, 2022, both of which are incorporated by reference herein.

FIELD OF THE DISCLOSURE

The present invention relates to a wheel generator, namely a converter for obtaining electrical energy in a rolling wheel of a vehicle from the deformation of the wheel tyre due to contact with the road surface. In particular, the present invention relates to a converter having the features of the preamble of claim 1. The present invention also relates to a system for obtaining electrical energy, as well as a vehicle or wheel comprising the system.

BACKGROUND

Vehicle tyres, in particular pneumatic tyres, are deformed under load in the area of the contact surface during the rolling process. In the process, the tyre is flexed and there is a loss of energy during power transmission due to heating. This effect is referred to as flexing.

The force required to flex the tyre is a major component of rolling resistance and acts against the driving force of a vehicle. On the one hand, increased flexing thus directly causes increased fuel consumption of the vehicle and can further also reduce the service life of the tyre. On the other hand, a certain deformation of the tyre and thus an increase in the contact area of the tyre on the ground is quite desirable for the purpose of increasing the traction coefficient of the vehicle and also for the purpose of enhancing driving comfort. Typically, therefore, the air pressure in a pneumatic tyre is set as a compromise between flexing and the traction of the vehicle.

The energy loss due to flexing of the tyre is one of the main components of the total energy loss in a vehicle, along with air resistance. In the field of electric cars in particular, the development of systems for recuperation (energy recovery, in particular for supplying the vehicle battery) based on exploiting the flexing of vehicle tyres has therefore been of interest for several years.

Various methods and systems for obtaining energy on or in the vehicle tyre are known in the prior art, primarily for supplying diverse tyre monitoring sensors arranged in the tyre with electrical energy, for example tyre pressure sensors.

WO 2015/054763 A1 thus discloses a generator in a tyre, in which using the slight deformation and reduction of space that occurs in the inner part of the tyre between the wheel and the same when in contact with the ground, a reciprocating motion is generated and a device is activated to rotate the generator.

Furthermore, EP 3 540 921 A1 discloses an energy converter for generating electrical energy in a rolling wheel of a vehicle by utilising the elastic deformation of the wheel between the driving plane and the centre axis of the wheel. The energy converter has a lever element with a projecting arm rotatably mounted about an axis of rotation, wherein the lever element is configured to be arranged in a wheel for a vehicle such that deformation of the tread towards the centre axis of the wheel produces a force acting on a contact surface of the projecting arm, and the force acting on the contact surface causes rotational movement of the projecting arm in a pumping rotational direction about the axis of rotation.

However, with the converters known in the prior art, direct contact with the wheel tyre occurs between the levers or projecting arms, which are firmly connected to the rim. It has been shown that at higher speeds, possibly with a typical car tyre no more than above approx. 50 km/h, direct contact between the levers and the wheel tyre results in considerable heating of the tyre material at the contact point, its softening and an increase in stickiness, damage to the wheel and thus ultimately to the failure of the generator.

US2004/0130157 A1 discloses a wheeled vehicle, which has mechanical and preferably hydraulic pumps in its tyres. The weight of the vehicle pumps up a storage tank as the tyres roll. The pressure in the storage tank is used to directly or indirectly drive the vehicle. The pumps are driven by brackets that carry rollers. These come into contact with specially designed beads on the inside of the tyre.

In all converters known in the prior art, the lever elements are further arranged at an angle considerably under 45° to the surface of the inside of the tyre. On the one hand, this reduces the forces that occur as a result of the direct contact between the levers and the surface of the inside of the tyre at the contact point. On the other hand, however, this reduces the effective displacement of the lever elements, i.e. the angular range they sweep during their movement.

Finally, numerous converters proposed in the prior art are very demanding in terms of the space they require inside the tyre, which makes changing the tyre while on the rim substantially more difficult. In some cases, the wheel, in particular the rim, has to be disassembled and the converter removed before the tyre can be changed. Therefore, the most compact design possible of the converter, in particular to enable a tyre change on the rim without removing the converter, would be desirable. At the same time, however, it is essential to guarantee a consistently reliable transmission of the substantial forces that act on the lever elements and need to be transferred to the generators.

SUMMARY

It is the object of the present invention to provide a converter for obtaining electrical energy in a rolling wheel of a vehicle from the deformation of the wheel tyre due to contact with the road surface, which does not have the problems of the prior art, and in particular guarantees reliable operation even at higher speeds with a high degree of efficiency, and is as compact as possible so as to allow a tyre change on the rim without disassembling the converter.

This object is achieved according to the present invention with a converter for obtaining electrical energy in a rolling wheel of a vehicle from the deformation of the wheel tyre due to contact with the road surface, comprising at least four lever elements, which at their first end are rotatably housed, and at their second end are configured to come into contact with the inside of a wheel tyre via at least one contact element such that a deformation of the wheel tyre due to contact with the road surface causes a rotational movement of the lever elements, a mechanical coupling element system which is suitable for transferring the force occurring due to the rotational movement of the lever elements, and at least one electrical generator configured to convert the force preferably transferred by the mechanical coupling element system into electrical energy, wherein the lever elements are each pivotally mounted at their first end by means of a shaft, and the shaft is configured to transmit the force of the rotational movement, the mechanical coupling element system per shaft of each lever element has at least two coupling elements, which are each arranged to transmit the force of the rotational movement to the shaft of the adjacent lever element or to an intermediate shaft, and at least one planetary gear is present, which is arranged to transmit the rotational movement of a shaft or an intermediate shaft to an electrical generator.

The invention is based on the realization that in the case of known generators, their levers or projecting arms, which are firmly connected to the rim, cause friction when they come into direct contact with the inside of the wheel tyre and consequently generate strong local heat. During its flexing movement, the wheel tyre performs a non-linear movement with respect to the rim, i.e. starting from the rim as the reference system, the movement of a defined part of the wheel tyre that comes into contact with the road surface is not on a straight line during a wheel rotation, but circumscribes a surface. In the case of levers or projecting arms that are only rotatably mounted, a relative movement of the corresponding contact surface of the wheel tyre and the contacting lever or projecting arm thus occurs when the wheel rotates, resulting in friction between them. The latter seems to lead to the failure of the known generators, in particular at higher speeds, as low as above approx. 50 km/h with a typical car tyre. Furthermore, the lever elements are arranged at an angle considerably under 45° to the surface of the inside of the tyre. On the one hand, this reduces the forces and thus the friction that occur as a result of the direct contact between the levers and the wheel tyre at the contact point. On the other hand, however, this reduces the effective displacement of the lever elements, i.e. the angular range they sweep during their movement.

Secondly, systems known in the prior art are very demanding in terms of the space they require inside the tyre, which makes changing the tyre while on the rim substantially more difficult. In some cases, the wheel, in particular the rim, must be disassembled and the converter removed before the tyre can be changed.

According to the invention, it has now surprisingly been found that these problems can be solved by means of a combination of measures, namely by virtue of the fact that on the one hand at least one contact element, typically a roller or part of a roller (roller segment), is rotatably housed at the second end of the lever element such that the contact element establishes contact between the lever element and the wheel tyre, and the axis of rotation of the contact element runs substantially parallel to the axis of rotation of the wheel. The contact element is rotatably housed at the second end of the lever element about an axis of rotation and establishes contact between the lever element and the wheel tyre. Thanks to its rotatable mounting, it is able to compensate for the relative movement between the wheel tyre and lever element via its own rolling movement and thus minimize or prevent friction between the wheel tyre and lever.

On the other hand, it has been found that by means of a specific arrangement of a mechanical coupling element system, which has at least two coupling elements for each shaft of each lever element, said coupling elements being arranged to transmit the force (energy) of the rotational movement to the shaft of the adjacent lever element or to an intermediate shaft, an extremely compact design is made possible that allows a reliable transmission for large forces too. If, in addition, at least one planetary gear is present which is arranged to transmit the rotational movement of a shaft to an electrical generator, the power transmission from the mechanical coupling element system to the generator can be made possible with minimal space requirement while realizing an appropriate gear ratio.

The invention is now described in further details based on preferred embodiments.

The converter according to the invention for obtaining electrical energy in a rolling wheel of a vehicle from the deformation of the wheel tyre due to contact with the road surface comprises at least four lever elements, which at their first end are rotatably housed, and at their second end are configured to come into contact with the inside of the wheel tyre via at least one contact element such that a deformation of the wheel tyre due to contact with the road surface causes a rotational movement of the lever elements. The wheel typically comprises a rim and a wheel tyre that can be filled with compressed air.

Rotational movement of the lever element is typically understood as a partial rotation (pivoting movement) of the lever element about the axis of rotation N at the first end. The lever element is therefore specifically designed to detect deformations of the wheel tyre occurring in the area of the contact surface by means of the contact element during the rolling process of the loaded wheel rolling on a substantially even driving plane and convert them into a rotational movement about the axis of rotation N at the first end of the lever element. The lever element thus has no direct contact itself with the inside of the tyre, but is rather merely in contact therewith via the at least one contact element. According to one embodiment of the converter, it or the lever element is therefore configured such that the contact surface of the contact element of the lever element is designed to establish contact with an inner surface of the tyre of the wheel.

Each lever element is rotatably mounted at its first end, preferably on the supporting structure or the rim of the wheel. In principle, the direction of rotation N at the first end of the lever element can have any direction that runs substantially parallel to its corresponding contact surface on the inside of the wheel tyre as the flexing movement of the inside of the wheel tyre, i.e. a movement towards the rim, can thus lead to a partial rotation of the lever element. In one preferred embodiment, the fulcrum of the lever element runs substantially parallel to the axis of rotation of the wheel.

Within the scope of the present invention, substantially parallel preferably means a deviation from the parallel of less than 10°, more preferably less than 5°.

In one preferred embodiment, the lever element is designed in one piece. In this embodiment, it preferably supports one, in particular only one, contact element, which is rotatably mounted thereon. In an alternative likewise preferred embodiment, the lever element is formed in at least two parts, i.e. consists of at least two, preferably only two, parts, which are mechanically connected, preferably partially rotatable relative to one another. By way of example, the first part of the lever element forms the first end, on which the lever element is rotatably mounted, the second part constitutes the second end, which supports the contact element(s). The partial rotatability of the first part relative to the second part enables the rotational movement (rocking movement) of the lever element to be compensated for during contact of the contact elements with the inside of the flexed tyre and at the same time the contact of the contact elements with the inside of the tyre to be maintained. In this alternative embodiment, the lever element, preferably each lever element, preferably supports at least two, in particular only two, contact elements, which are rotatably mounted on the lever element, in particular the second part. Particularly preferably, in the alternative embodiment, the lever element thus consists of a first part with the first end, and the second part, which constitutes a holding element for at least two, preferably two contact elements, thus preferably constitutes a rolling slide. The latter is configured such that both contact elements can make contact with the inside of the wheel tyre (surface of the inside of the tyre) at the same time. In this way, the contact surface on the inside of the wheel tyre can be increased, and thus the point force and thus the point load of the wheel tyre can be decreased. The second part (hereinafter also referred to as "slide") is mounted so as to be partially rotatable on the lever element in such a way that when the lever element is "pulled out", e.g. from the rest position, contact of all contact elements carried by the slide with the wheel tyre is enabled. In one preferred embodiment, the distance between the axes of rotation of the contact elements carried by the (each) slide is approximately equal (±10%, preferably ±5%) to the distance between the axes of rotation of two adjacent contact elements of second (directly) adjacent lever elements when the contact elements are in contact with the inside of the wheel tyre. By way of example, the distance between the axes of rotation of second contact elements carried by each of the slides of the preferably 8 or 12 lever elements is preferably approximately equal (±10%, preferably ±5%) to the distance between the axes of rotation of a contact element of a first slide and the axis of rotation of the nearest contact element of the (directly) adjacent slide. In other words, the angle β that the two axes of rotation of the contact elements of a slide span in relation to the axis of rotation of the wheel is preferably approximately 360°/2*n, wherein n is the number of lever elements or slides. The angle β that the two axes of rotation of the contact elements of a slide preferably span in relation to the axis of rotation of the wheel is therefore approximately (±10%, preferably ±5%) half the angle α between two lever elements. The angle α is the angle that the axes of rotation of two adjacent lever elements (as shown in FIG. 6), in other words, with the same position of the lever elements, also the axes of rotation of the slides, span in relation to the axis of rotation of the wheel. The angle α thus corresponds to 360°/n, wherein n is the number of lever elements. In this embodiment, the force distribution is distributed evenly over the wheel tyres (surface of the inside of the tyre), as the contact elements contact the wheel tyre at approximately the same distance. With 12 lever elements and two rollers per slide, 24 approximately equally (±10%, preferably ±5%) spaced contact elements are in contact with the inside of the tyre (the angle β between respectively adjacent contact elements, both of two contact elements of one slide and the respectively adjacent contact elements of two adjacent slides, is then approximately 15° (±10%, preferably ±5%)). Contact elements that are spaced more or less equally over the inside of the tyre also lead to a more even transfer of energy to the lever elements, as this means that in typical flexing deformations, for example of car or truck tyres, at least two lever elements are always displaced at the same time via their slides.

In one embodiment, the, preferably two, contact elements of a slide, preferably when they are designed as rollers, are surrounded or wrapped by a belt or strap. The belt or the strap runs, for example, directly around both rollers, or in addition around a deflection roller, which can also be arranged on the slide. The surrounded contact elements, preferably rollers, come into contact with the inside of the tyre in this case via the belt or the strap. This increases the effective contact surface of the contact elements with the inside of the tyre and thus reduces the point load and thus the load on the tyre. The belt can, for example, be designed as a V-belt or multi V-belt to prevent it from running off the rollers.

In one preferred embodiment, the converter has at least six lever elements, in particular at least 6 to 16, most preferably 8 to 12.

In one preferred embodiment, the converter has lever elements arranged rotationally symmetrically about the axis of rotation of the wheel, in particular at least 6 to 16, most preferably 8 to 12.

The lever element of the converter according to the invention comprises at least one contact element. The lever element makes contact with the inside of the tyre via said contact element such that a deformation of the wheel tyre due to contact with the road surface causes a (partial) rotational movement of the lever element. This means that the (each) lever element has at least one contact element rotatably mounted in or on the lever element at the second end, such that the contact element establishes contact between the lever element and the wheel tyre.

The (each) lever element preferably does not make direct contact with the inside of the wheel tyre in any position of the rotation about its axis of rotation N at its first end (under normal operation), i.e. it does not touch it. Rather, only the contact element(s) come(s) into contact with the inside of the wheel tyre, i.e. it touches it, if the lever element has rotated accordingly about the axis of rotation at the first end towards the tyre surface (away from the rim). The axis of rotation of the contact element(s) is substantially parallel to the axis of rotation of the wheel. If there is more than one contact element present on a lever element, their axes of rotation are parallel. The possibility that the contact element is, on the one hand, mounted rotatably on the lever element and, on the other hand, can rotate about an axis that lies substantially parallel to the axis of rotation of the wheel makes it possible that the relative movement between the wheel tyre and lever element is compensated and thus the friction between the wheel tyre and lever element is minimized. The contact element is preferably substantially rotationally symmetrical with respect to its axis of rotation in terms of its dimensions, at least in the area that comes into contact with the inside of the wheel tyre. In particular, it is thus a roller or partial roller (roller segment). The roller has a substantially cylindrical shape (the axis of rotation of the contact element then corresponds to the cylinder axis), possibly with a circular outwardly curved cylindrical outer surface (barrel-shaped roller). Typical suitable radii of the contact element, i.e. preferably roller radii, are those where the ratio of the radius of the contact element to the radius of the inside of the wheel tyre R (around the centre of the wheel) is in the range of 0.04 to 0.08, preferably 0.05 to 0.07. Typical suitable roller radii, in particular for a car tyre, are thus in the range of 18 mm to 30 mm. The contact element can preferably be rotated freely with respect to its fulcrum, in particular is freely rotatable by 360°. This means that the contact element can preferably rotate freely about the axis of rotation about which it is rotatably mounted and fixed to/in the lever element or slide, in particular completely about its own axis. This ensures uniform contact of the contact element with the inside of the wheel tyre during operation even at higher speeds.

According to one preferred embodiment, the ratio of the distance A of the fulcrum of the lever element N from the wheel centre M to the radius of the inside of the wheel tyre R (A/R) is in the range of 0.55 to 0.60, preferably 0.56 to 0.59.

According to one preferred embodiment, the ratio of the distance B of the fulcrum of the lever element N from the contact point K of the contact element with the inside of the wheel tyre, (in the case of a plurality of contact elements per lever element, the one with the greatest distance from the fulcrum N), to the radius of the inside of the wheel tyre R (B/R) is in the range of 0.44 to 0.55, preferably 0.45 to 0.53, in particular 0.46 to 0.50.

In the converter according to the invention, the lever element, which at its first end is rotatably housed, can come into contact with the inside of the wheel tyre via the at least one contact element. This means that the sum of the distance A of the fulcrum of the lever element N from the wheel centre M and the distance B of the fulcrum N from the contact point K of the contact element with the inside of the wheel tyre (in the case of a plurality of contact elements per lever element the contact point with the greatest distance from the fulcrum N) (A+B) is more than the radius of the inside of the wheel tyre R ((A+B)/R)>1).

The displacement of the lever elements, i.e. the angular range they sweep during their movement, is preferably considerably increased if the sum (A+B) of the distance A of the fulcrum N of the lever element from the wheel centre M and the distance B of the fulcrum N from the contact point K of the contact element with the inside of the wheel tyre, in the case of a plurality of contact elements per lever element the contact point with the greatest distance from the fulcrum N, relative to the radius of the inside of the wheel tyre R ((A+B)/R)) is in the range from 102% to 110%, in particular 103% to 107%. This value range for (A+B)/R means a considerably more "stretched" arrangement of the lever elements compared with the prior art such that these are arranged almost vertically opposite the inside of the tyre. Although this increases the forces and relative movement between the wheel tyre and lever element, it enables a high degree of efficiency as it is only by increasing the angular range that the lever elements sweep during their movement that an effective drive of the generators can be ensured.

The radius R always refers here to the radius of the unloaded tyre from the centre of the wheel to the inside of the wheel tyre (surface of the inside of the tyre). The fulcrum of the lever element N refers to the fulcrum of the lever element at its first end.

The converter according to the invention further comprises a mechanical coupling element system. This is configured and suitable for transferring the force (energy) occurring due to the rotational movement of the lever elements, namely preferably to the generator(s). The mechanical coupling element system in this case comprises at least two coupling elements per shaft of each lever element. Typical suitable coupling elements are gears and axles, belts, chains and the like. The coupling element preferably comprises at least one chain or belt, in particular a toothed belt and/or multi V-belt. The mechanical coupling element system in this case typically also comprises corresponding means for the engagement of the coupling elements with the shafts of the lever elements, e.g. gears, grooved wheels, and the like.

The force (energy) of all lever elements of the converter is preferably transferred to the (common) mechanical coupling element system, for example a set of chains or belts, in particular toothed belt and/or multi V-belt. The mechanical coupling element system preferably comprises at least two coupling elements per shaft of each lever element, wherein all the shafts of the lever elements are in frictional connection with the respective adjacent shafts of the lever elements or via intermediate shafts through a coupling element in each case by means of the mechanical coupling element system. Since the lever elements are preferably arranged rotationally symmetrically around the axis of rotation of the wheel, i.e. in a ring shape, a 'ring closure' is preferably established, meaning that all the shafts of the lever elements are in frictional connection with the respective adjacent shafts of the lever elements around the wheel via a coupling element by means of the mechanical coupling element system. The number of coupling elements of the mechanical coupling element system therefore preferably corresponds to the number of shafts of the lever elements. In other words, there are preferably no intermediate shafts present.

The mechanical coupling element system thus enables the frictional connection between all lever elements of the converter. This allows the generator(s) to be driven more continuously. The mechanical coupling element system is preferably also in frictional connection with multiple, most preferably with all, generators of the converter. By distributing the total energy generated by the lever elements to several generators, they can be operated continuously, which allows efficient energy recovery with minimal material input.

In one preferred embodiment, the converter therefore comprises a mechanical coupling element system, which is designed as a belt, in particular a V-belt, toothed belt or multi V-belt, and which establishes the frictional connection of all lever elements, preferably 8 or in particular 12, of the converter with all generators, preferably three or four. It is preferred in this case that a belt is guided respectively around a roller or a gear that is connected to the shaft of a lever element, and around a roller or a gear that is connected to the shaft of an adjacent lever element. In one embodiment there may be one or multiple interposed free-wheeling rollers or rollers on intermediate shafts which are connected via coupling elements. There are preferably no interposed free-wheeling rollers or rollers that are not connected to a shaft of a lever element and/or only to a generator. In the most preferred embodiment, the converter therefore comprises a mechanical coupling element system that comprises 12 belts, in particular V-belts, toothed belts or multi V-belts and provides the frictional connection of all shafts of the 12 lever elements.

Finally, the converter according to the invention comprises at least one electrical generator, which is configured to convert the force (energy) obtained by the rotary movement of the lever element(s), preferably transferred by the mechanical coupling element system, into electrical energy. In one preferred embodiment, the converter has at least two generators arranged rotationally symmetrical about the axis of rotation of the wheel, in particular at least 2 to 12, most preferably 3 to 8, for example three or four. The number of lever elements is preferably a multiple of the number of generators.

According to the invention, at least one planetary gear is provided, which is arranged to transmit the rotational movement of a shaft of a lever element to an electrical generator. Planetary gears, also referred to in the prior art as epicyclic gears, are gear or friction gear systems that, in addition to fixed shafts, also have axes that revolve in circular orbits around the fixed frame. Accordingly, a distinction is made between central or sun gears mounted on the fixed shafts and the orbiting, planet or star gears mounted on the rotating axes. The star gears rotating on the revolving axes orbit a central gear, similarly to how planets orbit the sun. The carrier, which holds the revolving axes, itself rotates around a fixed shaft. Suitable planetary gears and, in particular, suitable materials for the planetary gear used according to the invention, e.g. stainless steel, are known in the prior art. Planetary gears are compactly designed gears with the special feature that the fixed shafts (or shafts for torque transmission) are aligned with each other. Therefore, the planetary gear is particularly advantageous for the converter according to the invention.

In a preferred embodiment, the planetary gear system used in the invention comprises at least one ring gear (acting as the central gear), as well as several planetary gears, whose axes of rotation are parallel to the axis of rotation of the ring gear, and which are supported by means of a carrier. The planetary gears preferably revolve around an (inner) sun gear, wherein said sun gear shares the axis of rotation of the ring gear and is parallel to the axes of rotation of the planetary gears. According to the invention, the planetary gear system is preferably operated in so-called two-shaft mode, specifically as a stationary transmission, i.e. the carrier is still and fixed in place, and both central gear shafts, in other words, the ring gear and the sun gear, rotate. Preferably, the planetary gears and the (inner) sun gear are arranged within the ring gear. This arrangement allows for an extremely compact design of the planetary gear system. Typically, there are 2 to 4 planetary gears, in particular three planetary gears per ring gear. The sizing is preferably such that the planetary gear system converts the rotational movement of the ring gear into a faster rotation of the sun gear, with a gear ratio of approximately 1:4 to 1:10, in particular 1:5 to 1:8.

The electrical generator is preferably arranged and configured such that the force (energy) transmitted by the planetary gear system is converted into electrical energy. It is further preferred that the planetary gear system, preferably the ring gear thereof, is coupled to a shaft of a lever element and, in particular, arranged directly between the shaft of a lever element and the generator. It is also preferred that the shaft of the lever element is connected to, or preferably integrally formed as, the ring gear. The axes of the planetary gears are typically fixed, i.e. they are directly or indirectly connected to the frame. The sun gear is preferably directly connected to the generator drive shaft or even integrally formed as the generator drive shaft. Through this arrangement, a preferred embodiment is made possible, in which the planetary gear system converts the rotational movement of the shaft of the lever element into a faster rotation, preferably with a gear ratio of approximately 1:4 to 1:10, particularly 1:5 to 1:8, directed toward the generator. In a particularly preferred embodiment, the planetary gear system is substantially integrated into the ring gear on the shaft of the lever element or an intermediate shaft, meaning that the planetary gears and the sun gear are substantially housed within the ring gear, which is preferably part of the shaft of the corresponding lever element or an intermediate shaft. Preferably, the coupling elements of the mechanical coupling element system run through the ring gear. This allows for an extremely compact design of the mechanical coupling element system, as well as the gearbox for the generator. It is preferred in this case that the generator is arranged immediately following, i.e. adjacent to, the planetary gear system, in particular on the side opposite to the shaft of the lever element.

The rotor of the generator is typically moved or driven via the mechanical coupling element system and the planetary gear, the stator of the generator is connected to the support element/rim of the wheel. As explained above, the carrier of the planetary gear which supports the axes of the planetary gears preferably forms the static part of the planetary gear. The axis of the sun gear then represents the axis on which the rotor of the generator is arranged.

All generators of the converter are preferably driven simultaneously in a coupled manner via the mechanical coupling element. This means that, preferably, all generators are driven via corresponding planetary gears which are arranged on the shafts of corresponding lever elements, wherein the shafts of the lever elements are in frictional connection via the mechanical coupling element system. In this case, the ring gears of the planetary gear systems preferably form part of the mechanical coupling element system, with the coupling elements running, in particular, through the ring gears.

Alternatively, the rotor of the generator is moved via direct coupling with intermediate shafts, for example a connecting element attached or coupled thereto, for example a connecting wheel; the stator of the generator is connected to the support element/rim of the wheel. In this embodiment, the force of the lever elements is transmitted through the mechanical coupling element system to all intermediate shafts and via these to the generators, preferably all generators simultaneously, and these are thereby driven.

In order that the electrical generator, for example, can nevertheless be driven at suitable speeds even by relatively small displacements of a lever element and thus small movement of the mechanical coupling element system, the converter has the planetary gear system. Where appropriate, there may be a further gearbox or transmission, preferably per generator, configured to produce an additional defined transmission between the planetary gear system and the rotary movement of the rotor of the generator. For example, the gearbox and/or transmission is configured to produce a transmission between the planetary gear system and the rotary movement of the rotor towards higher speeds of the rotor, in particular a transmission with a ratio greater than 1 to 1:4, preferably 1:2 to 1:3. However, it is preferred for there to be no additional gearbox for the generator apart from the planetary gear system.

In order to guarantee continuous movement and thus power transmission of the mechanical coupling element, it is preferred that the lever element(s) transfer the force to the shaft of the lever element, for example, via a freewheel clutch, i.e. a clutch dependent on the direction of rotation. The converter thus preferably has one freewheel clutch per lever element, configured for coupling depending on the direction of rotation, i.e. having a coupling direction for producing an acting coupling and a freewheeling direction. Typically, the freewheel clutch is configured such that the frictional connection occurs when the lever element moves towards the axis of rotation of the wheel, and correspondingly the freewheeling occurs when the lever element moves away from the axis of rotation of the wheel. The lever element, the freewheel clutch, the mechanical coupling element system, the planetary gear system and the electrical generator are preferably arranged and configured in such a way that the rotary movement of the lever element is transferred to the rotor(s) of the electric generator(s) via the freewheel clutch in the coupling direction via the mechanical coupling element system and is converted into electrical energy.

According to a further preferred embodiment, the converter according to the invention has a biasing means for the lever element(s), in particular a spring, which biases the rotation of the lever element about its first end with a force in the rotational movement of the lever elements caused by the deformation of the wheel tyre due to contact with the road surface, i.e. in the direction of rotation of the lever element towards the axis of rotation of the wheel. The biasing element ensures that the lever element(s) are not in contact with the wheel tyre when the wheel is at a standstill or when the wheel is only moving at a low speed, i.e. that the lever element(s) remain in a "retracted" state. The latter makes it easier to repair the wheel and change the tyre on the wheel. The biasing means is then appropriately configured so that from suitable rotational speeds of the wheel, a movement of the lever element away from the axis of rotation of the wheel is allowed (the centrifugal force therefore exceeds the biasing force) and the contact element of the lever element can come into contact with the wheel tyre. The biasing means is preferably configured such that from rotational speeds of the wheel of at least 100 rpm, more preferably at least 120 rpm, a movement of the lever element away from the axis of rotation of the wheel is allowed. Typical rotational speeds are around 125 rpm, which corresponds to a speed of around 15 km/h (in a car).

In order to prevent forces acting on the lever element from damaging the converter or its components due to excessive shocks and/or excessive deformation of the wheel tread, a corresponding protective mechanism is preferably provided, in particular an overload protection device. Preferably, the freewheel clutches, the clutches within or to the mechanical coupling element and/or the clutches to the generators are safety clutches with overload protection, which allow rotation without effective coupling if defined maximum forces are exceeded.

The present invention further relates to a system for obtaining electrical energy in a rolling wheel of a vehicle from the deformation of the wheel tyre due to contact with the road surface, comprising a converter as described above as well as a support element/wheel rim as a supporting structure. In one preferred embodiment, the lever elements including contact elements do not project over the rim flanges, i.e. over the outer surface of a cylinder defined by the rim flanges.

In one embodiment, the system has a converter as described above as well as a supporting structure, wherein the supporting structure is typically configured so as to hold the energy converter in a fixed arrangement around the centre axis of the wheel.

In particular, the supporting structure can be designed itself as the rim of the wheel or be integrated therein, or the system has a rim (specially provided to be combined with the supporting structure) configured to receive the supporting structure in a fixed manner. The rim is preferably designed in one part.

According to a further embodiment, the system has a multi-part rim, which can simplify the installation of the converter or the supporting structure in the wheel. For example, the multi-part rim is designed as a two-part rim with a rim well and a rim sleeve or as a three-part rim with a rim well, a rim sleeve and a rim star. In this case, the converter or the supporting structure and the multi-part rim can be configured, for example, such that the converter or the supporting structure is mounted on a rim well of the multi-part rim.

Finally, the present invention relates to a land vehicle, preferably a motor vehicle or a lorry, or a wheel, comprising a system as described above. In one embodiment, the wheel also comprises a rim motor.

BRIEF DESCRIPTION OF THE FIGURES

The invention will now be described based on the drawings.

Figure 1:
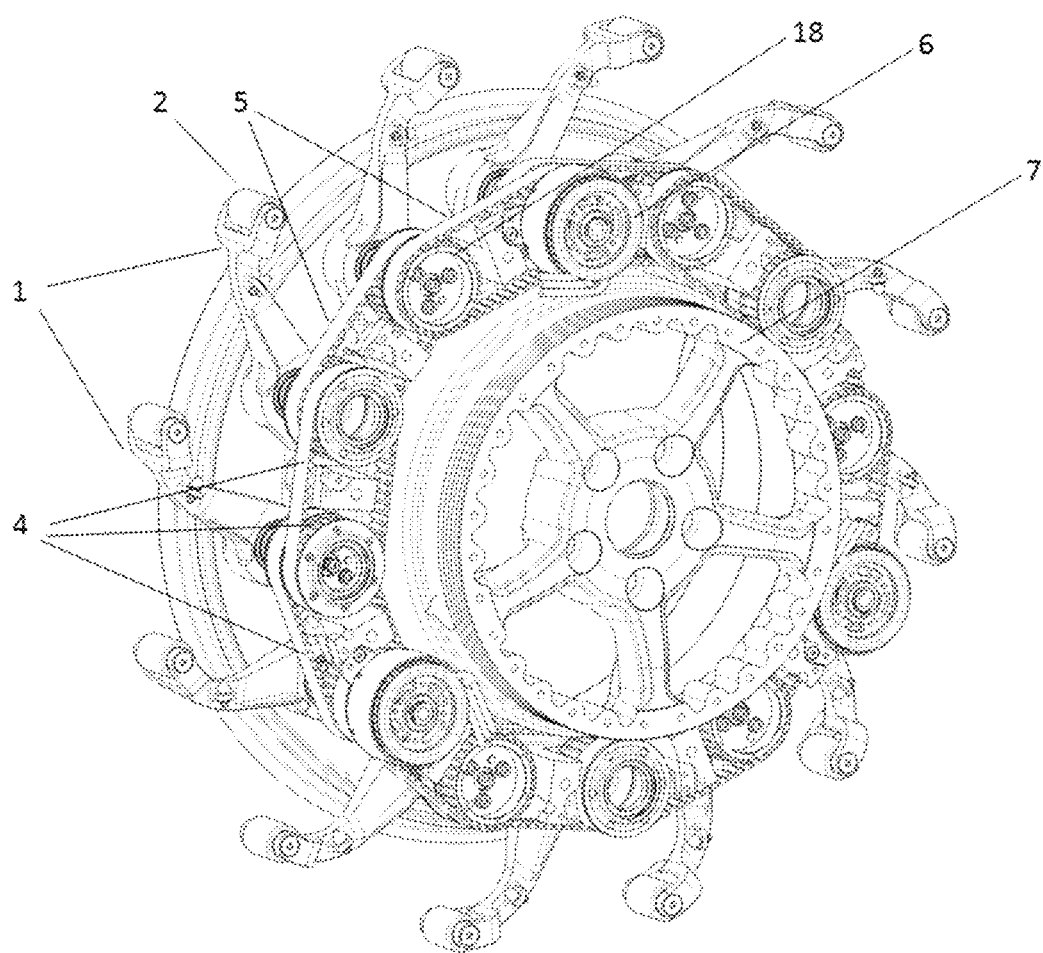
FIG. 1 shows a perspective view of a converter according to the invention with lever elements and the mechanical coupling element system on a rim.

A converter according to the invention is shown in FIG. 1, which comprises lever elements 1 including contact elements 2, in this case rollers, and a mechanical coupling element system 4. The converter is mounted on a rim 7. The deformation of the tyre (not shown) due to contact with the road surface causes the lever elements 1, which lie against the inside of the tyre in the area of the contact with the road surface via the contact element, to partially rotate about the axis of rotation of the lever element on its first end, and therefore around the shaft of the lever element. The lever elements 1 perform a "rocking motion" during operation. The restoring force that brings the lever back to the "extended" position, after passing the deformed section of the tyre caused by its compression, is generated by the centrifugal force due to the rotation of the wheel. The lever elements 1 are mounted on their shafts via a freewheel clutch, which ensures that the shaft rotates in only one direction—specifically when the lever element is pushed towards the axis of rotation of the wheel. This rotation of the shaft also turns the drive roller 18. The force generated is transferred from the drive roller 18 through the coupling system 4, particularly via the respective toothed belts 5, to the neighbouring rollers. Each drive roller 18, along with the neighbouring rollers, preferably carries two toothed belts, creating a "closed loop," meaning that all shafts of the lever elements are frictionally connected to the adjacent shafts of the lever elements around the wheel through a mechanical coupling element system 4 using a respective coupling element 5. Three generators 6 are attached to planetary gear systems integrated accordingly into the drive rollers 18 (not visible). The lever elements 1 and generators 6 are arranged rotationally symmetrically around the axis of rotation of the wheel to avoid imbalance of the wheel. Due to the movement of a single lever element 1, all drive rollers 18 are rotated, thereby also driving all three generators 6.

Figure 2:
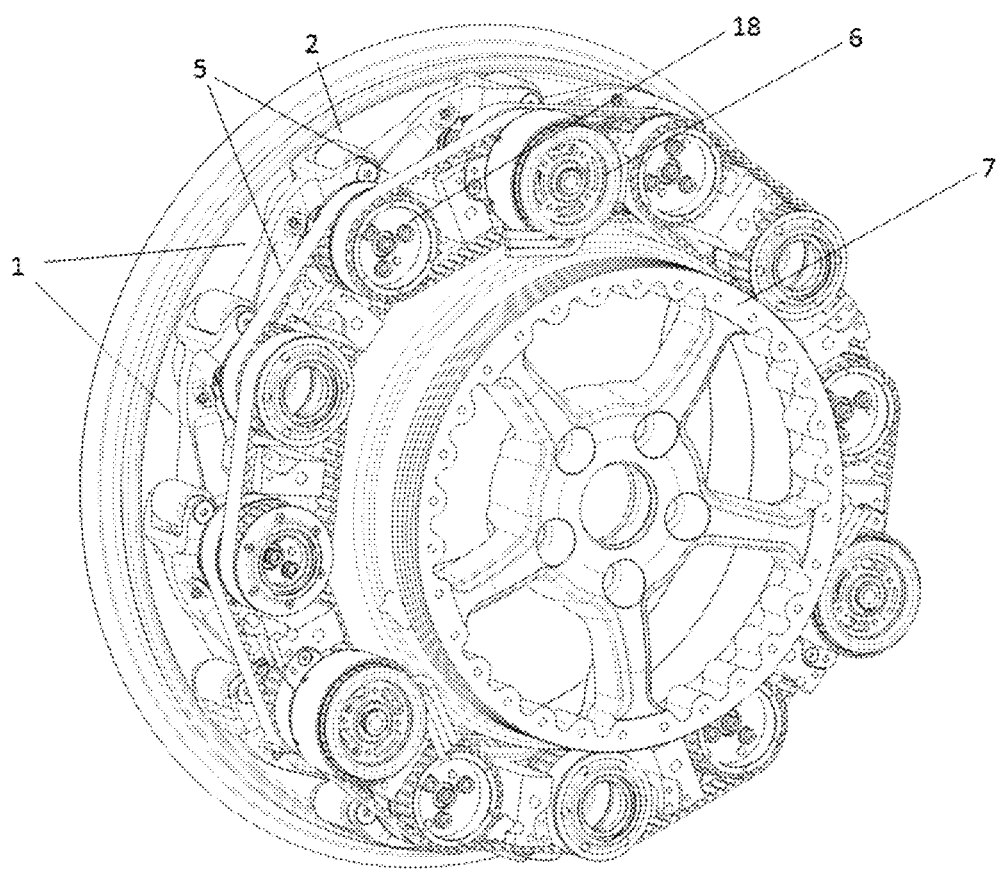
FIG. 2 shows a perspective view of a converter according to the invention with lever elements and the mechanical coupling element system on a rim.

FIG. 2 shows a converter according to the invention similar to FIG. 1, but with the lever elements 1 in a retracted state, for example due to the limited effect of the centrifugal force when the wheel is stationary or only rotating at a slow speed, in other words is shown folded against the rim 7. When the centrifugal force has little influence, such as when the wheel is stationary or only rotating at a slow speed, a return element (not shown), for example a return spring, causes the lever elements to fold inwards, allowing a tyre change on the rim, for example, or the avoidance of damage when driving over uneven terrain, such as a curb.

Figure 3:
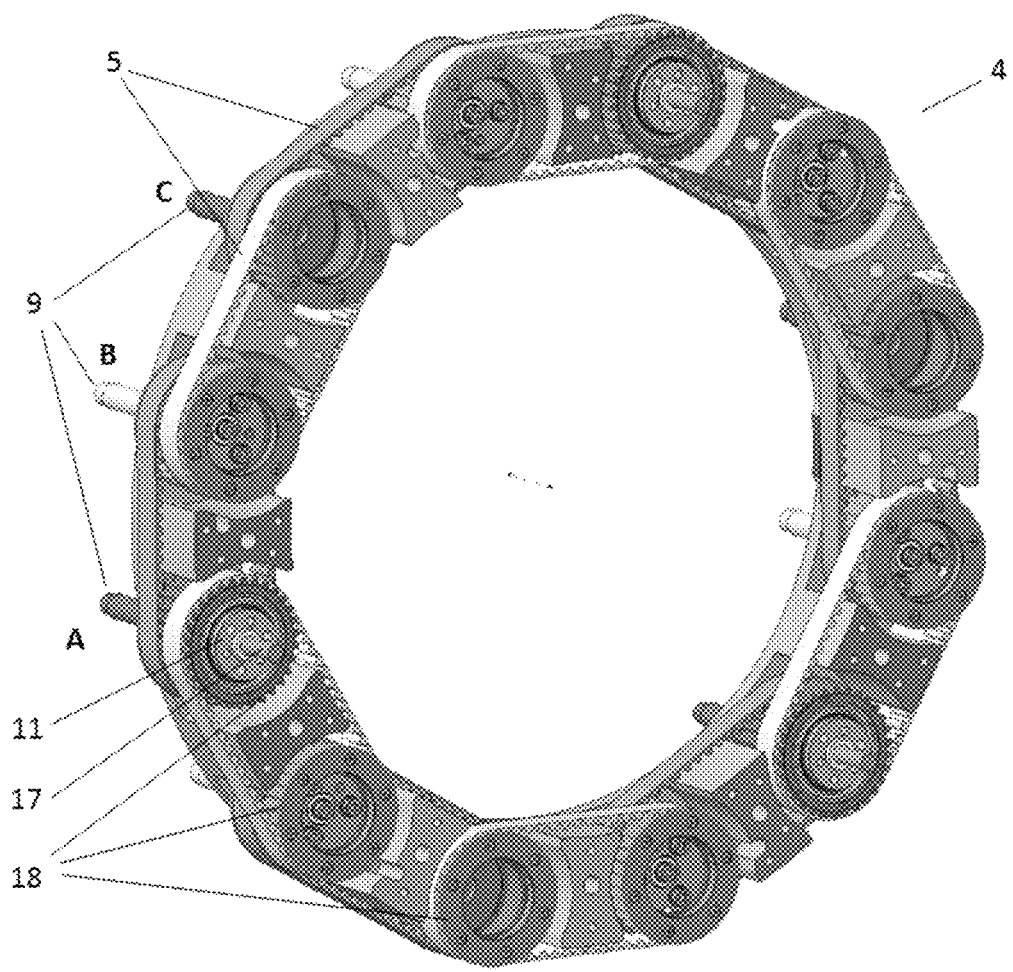
FIG. 3 shows a perspective view of a mechanical coupling element system including the planetary gear system of a converter according to the invention.

FIG. 3 shows a mechanical coupling element system 4, comprising the drive rollers 18 which are located on the shafts 9 of the lever elements, as well as corresponding coupling elements 5, implemented here as toothed belts. The shafts 9 and the corresponding drive rollers 18 come in three embodiments: A, B, and C. In embodiment A of the shaft, a planetary gear system 11 is provided inside the drive roller 18. A generator (not shown) is driven via the generator shaft 17, which also forms the axis of the sun gear of the planetary gear system. Embodiment C of the shaft corresponds to embodiment A of the shaft, but without the planetary gear system 11, as typically not every drive roller 18, e.g. only every fourth one, is provided with a generator. Typically, every second drive roller 18, as indicated in embodiment B of the shaft, instead of being equipped with a planetary gear is fitted with means for attaching, and possibly also tensioning, the coupling elements 5, in this case the toothed belts, when they are installed.

Figure 4:
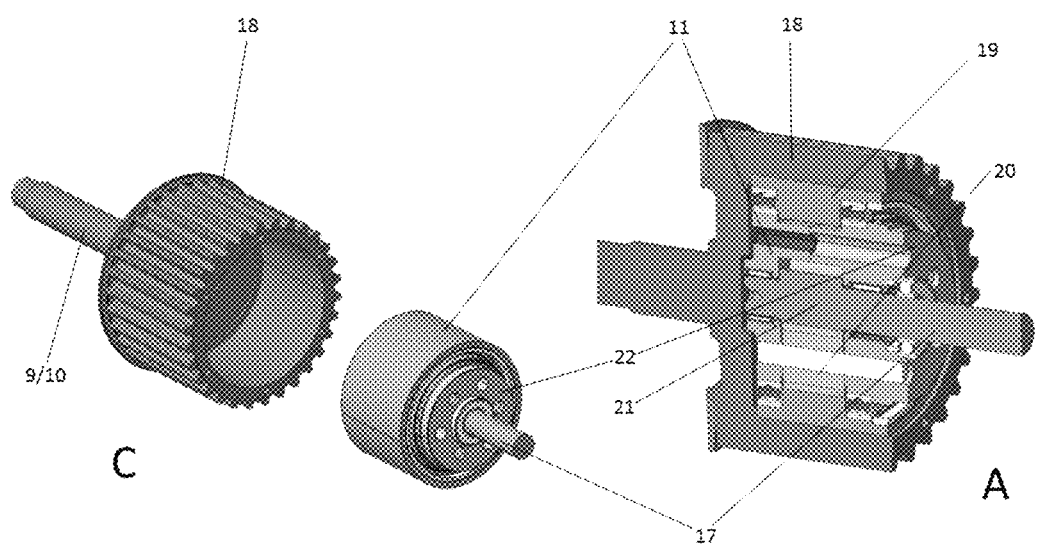
FIG. 4 shows a perspective view of a planetary gear in (A) and outside (C) the gear of a shaft.

FIG. 4 shows details of the drive roller 18, which is located on the shafts 9 of the lever elements, in embodiments A and C, as described in FIG. 3. In an alternative embodiment of the converter according to the invention, the shafts may also represent intermediate shafts 10 that do not carry a lever element. In embodiment A of the shaft, a planetary gear system 11 is provided inside the drive roller 18. A generator (not shown) is driven via the generator shaft 17, which also forms the axis of the sun gear of the planetary gear system. Inside the roller 18, the ring gear 19 of the planetary gear system is firmly connected to the roller 18 and in some cases the roller 18 itself also forms the ring gear 19 of the planetary gear system. The axes of the planet gears 20 are fixedly arranged on the carrier 22. The shaft of the sun gear 21 of the planetary gear system is (integrally) formed as the generator drive shaft 17. Embodiment C of the shaft corresponds to embodiment A of the shaft, but without the planetary gear system 11, as typically only every fourth drive roller 18 is equipped with a generator.

Figure 5:
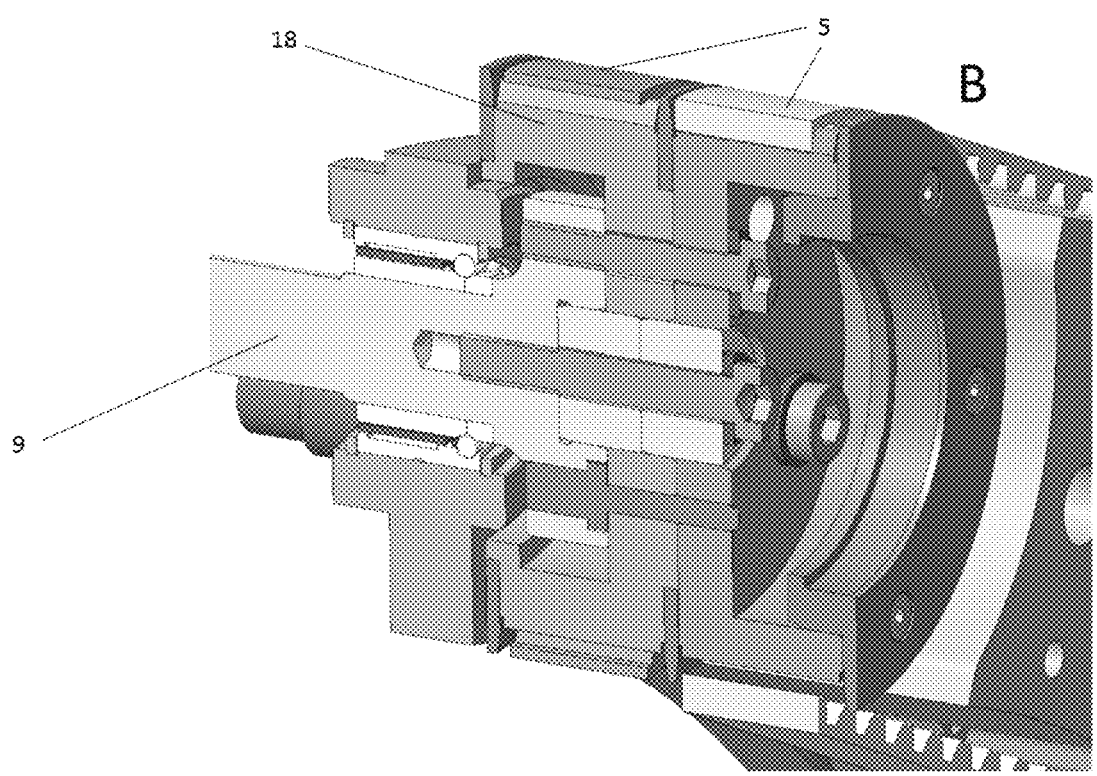
FIG. 5 shows a perspective view through a shaft (B) of a lever element without planetary gear.

FIG. 5 shows details of the drive roller 18 which is located on the shaft 9 of a lever element, in embodiment B, as also described in FIG. 3. Instead of a planetary gear system, the roller 18 is equipped with means for attaching, and possibly also for tensioning, the coupling elements 5, in this case toothed belts, during their installation. For this purpose, the roller is preferably designed in two parts. The first part of the roller 18 holds a coupling element 5, in this case designed as a toothed belt. The second part is separately attached to the first part of the roller, and possibly also to the shaft 9, so that it can be added preferably after the coupling element 5 is installed on the first part of the roller 18. The second part of the roller 18 also carries a coupling element 5, in this case designed as a toothed belt. Preferably, the arrangement of the rollers 18 in the converter alternates around the wheel, with embodiments A and C alternating and an embodiment B positioned therebetween. Therefore, every second roller is an embodiment B, equipped with means for attaching and possibly tensioning the coupling elements (5), in this case toothed belts, during their installation. This configuration allows for easy handling and proper tensioning of the toothed belts on the drive rollers 18 of the converter according to the invention.

Figure 6:
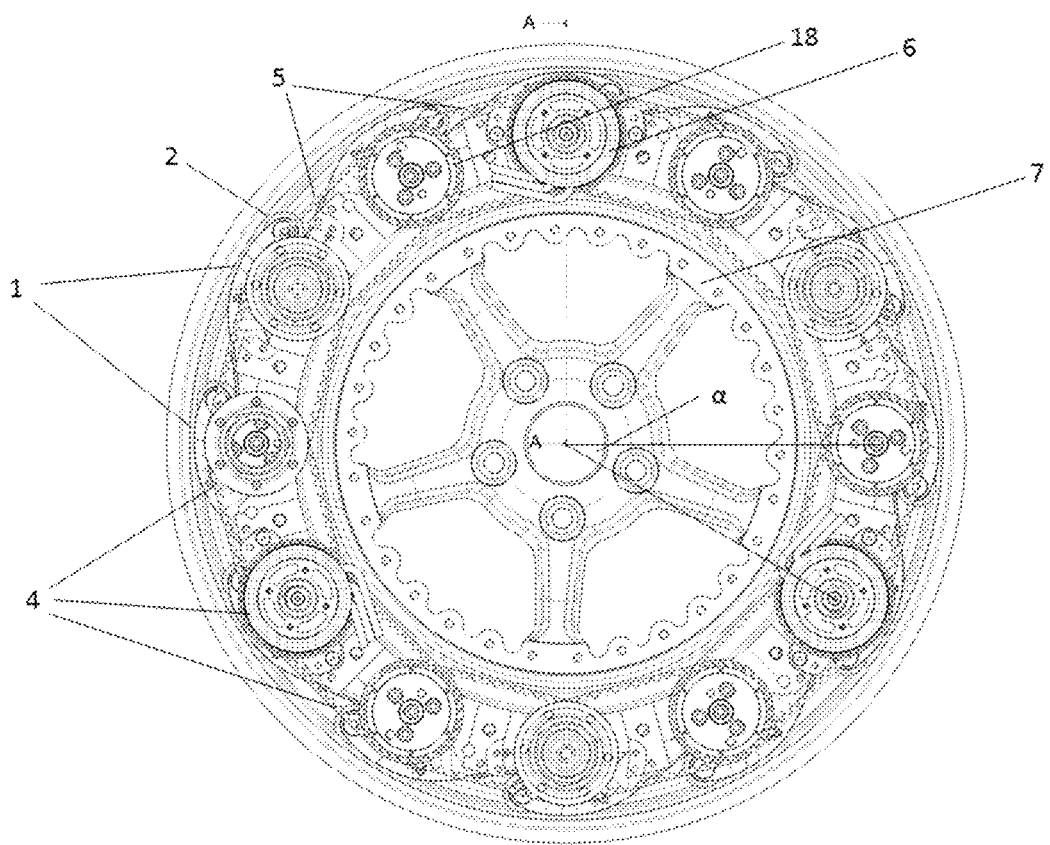
FIG. 6 shows a schematic side view of a converter according to the invention with lever elements and the mechanical coupling element system on a rim.

FIG. 6 shows a side view of a converter according to the invention, as shown in FIG. 2, which comprises lever elements 1 including contact elements 2, rollers in this case, as well as a mechanical coupling element system 4. The lever elements are shown in the retracted state, for example due to the limited influence of centrifugal force when the wheel is stationary or rotating at slow speed, meaning they are folded against the rim 7. Also depicted is the mechanical coupling element system 4, comprising the drive rollers 18 and corresponding coupling elements 5, in this case designed as toothed belts. The lever elements 1 and the generators 6 are arranged rotationally symmetrically around the rim 7, in order to avoid an imbalance of the wheel. The angle $\alpha$, which is spanned by the shafts of two adjacent lever elements 1 relative to the rotational axis of the wheel, is 360°/number of lever elements, in this case is 360°/12=30°.

Figure 7:
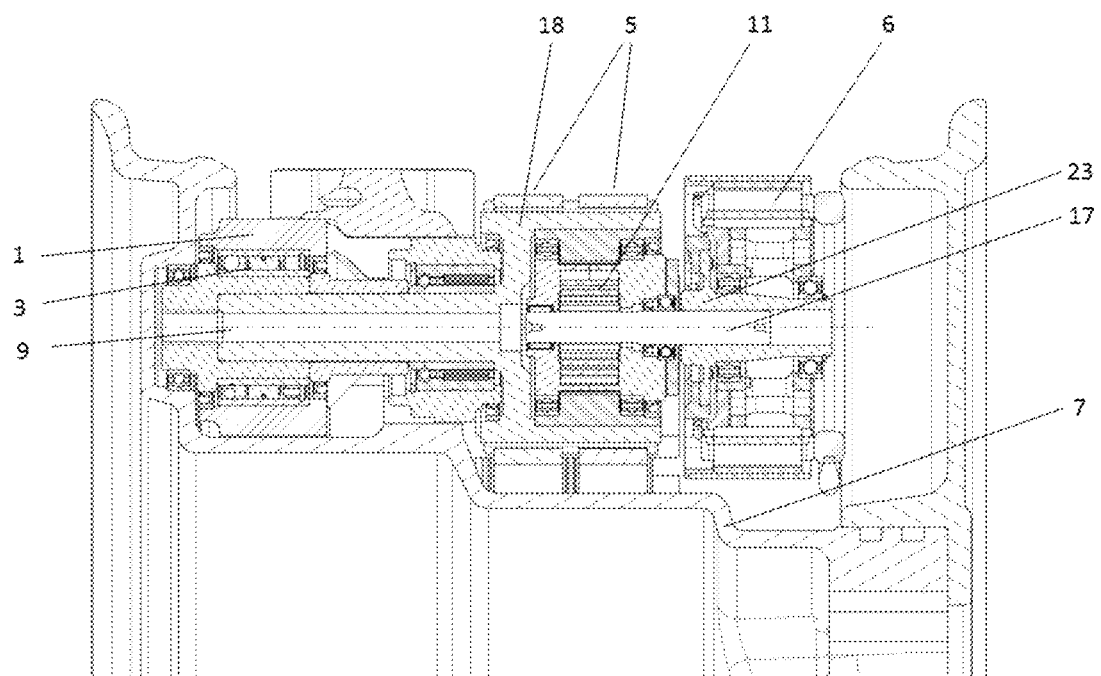
FIG. 7 shows a section through a converter according to the invention with lever elements, the mechanical coupling element system, the planetary gear system and the generator.

FIG. 7 shows the section A-A, as indicated in FIG. 6, through the rim 7 and the converter according to the invention. The lever element 1 is mounted on the shaft 9 via the freewheel clutch 3. This clutch transmits the rotational movement generated by the rocking motion of the lever element to the drive roller 18 and corresponding coupling elements 5, which are designed as toothed belts in this case. The rotation is stepped up in speed by the planetary gear system 11 and transferred to the generator drive shaft 17 on the rotor 23 of the generator 6.

Figure 8:
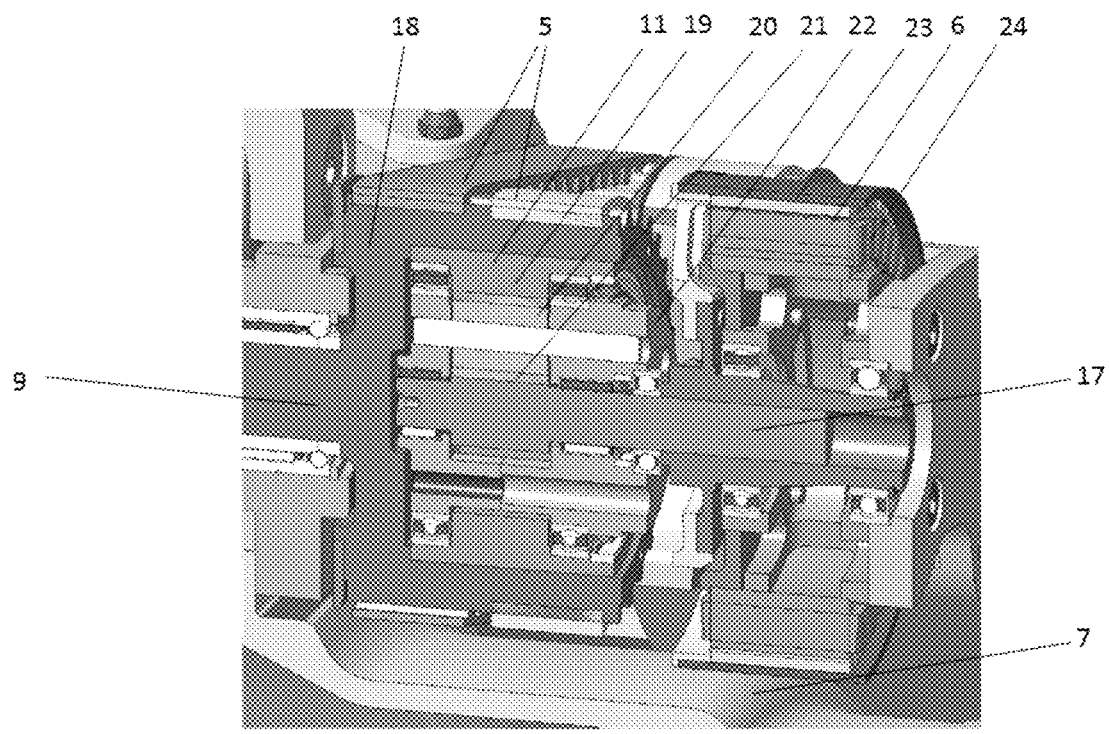
FIG. 8 shows a perspective section through a shaft of a lever element, the mechanical coupling element system, the planetary gear system and the generator.

FIG. 8 shows a section of the A-A cut, as indicated in FIG. 6, through the rim 7 and the converter according to the invention in a perspective view. The shaft 9 transmits the rotational movement generated by the rocking motion of the lever element to the drive roller 18 and the corresponding coupling elements 5, in this case designed as toothed belts. The rotation is stepped up in speed by the planetary gear system 11 and transferred to the generator drive shaft 17 of the generator 6. Inside the drive roller 18, a planetary gear system 11 is provided for this purpose. Inside the roller 18, the ring gear 19 of the planetary gear is firmly connected to the roller 18, and in some cases the roller 18 itself forms the ring gear 19 of the planetary gear system. The axes of the planet gears 20 are fixedly arranged on the carrier 22. The shaft of the sun gear 21 of the planetary gear system is (integrally) formed as the generator drive shaft 17. This shaft carries the rotor 23 of the generator. The stator 24 of the generator is connected to the rim 7.

Figure 9:
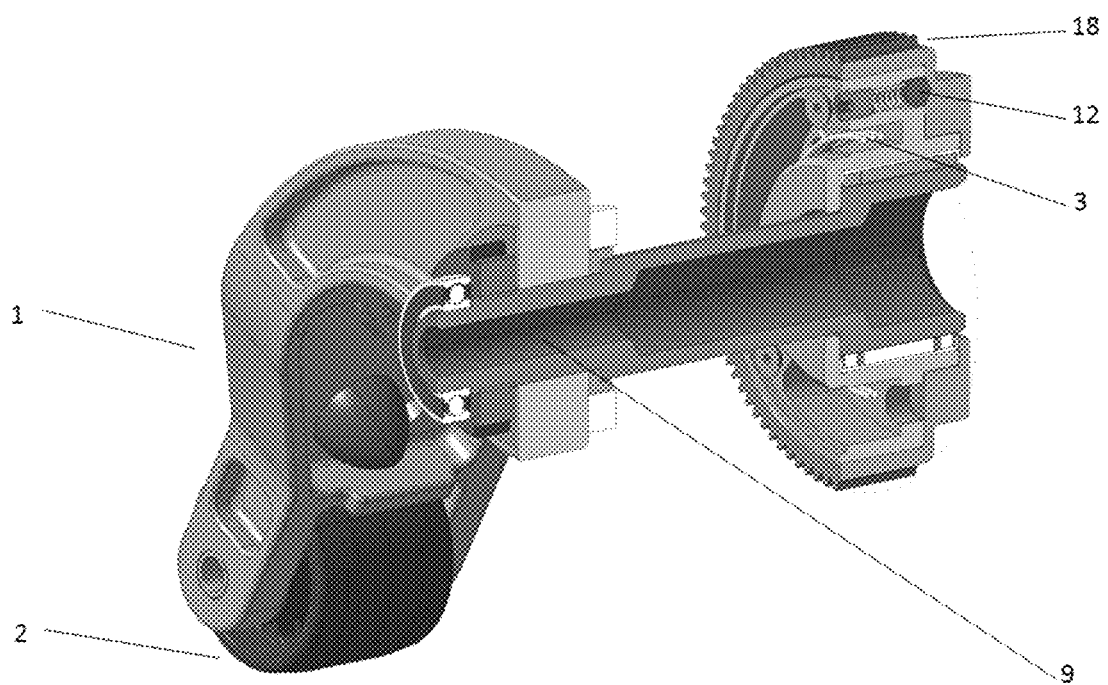
FIG. 9 shows a perspective view of a lever element including contact element.

FIG. 9 shows a detail view of an embodiment of a lever element 1 with a contact element 2, in this case designed as a roller. The force is transmitted to the drive roller 18 via the shaft 9 at the first end of the lever element 1. The drive roller transmits the force to the mechanical coupling elements (not shown). The freewheel clutch 3 transfers the movement of the lever element only in one direction of rotation; the overload protection device 12 ensures that excessive forces are not transmitted.

Figure 10:
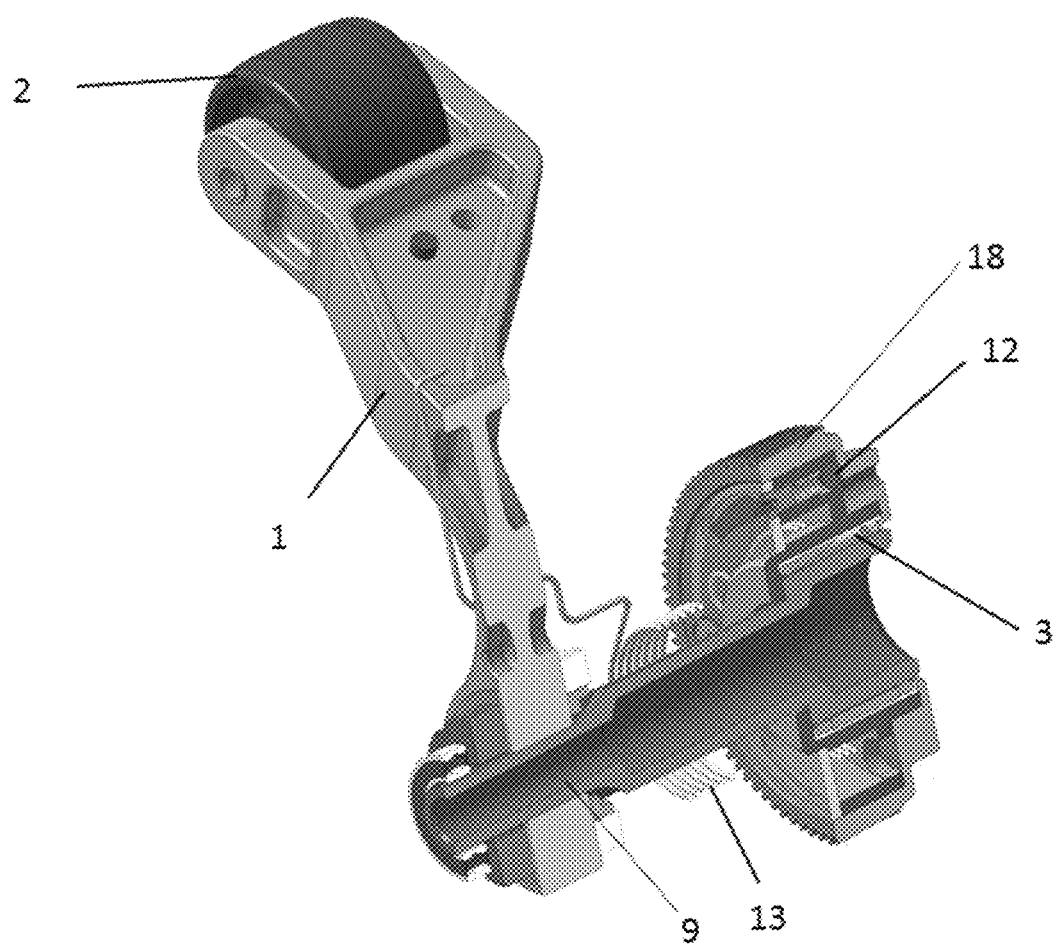
FIG. 10 shows a perspective view of a lever element including contact element.

FIG. 10 shows a detail view of an embodiment of a lever element 1 with a contact element 2, in this case designed as a roller. The force is transmitted to the drive roller 18 via the shaft 9 on the first end of the lever element 1. The drive roller then transmits the force to the mechanical coupling elements (not shown). The freewheel clutch 3 transfers the movement of the lever element only in one direction of rotation; the overload protection device 12 ensures that excessive forces are not transmitted. A spring is used as the biasing element 13.

Figure 11:
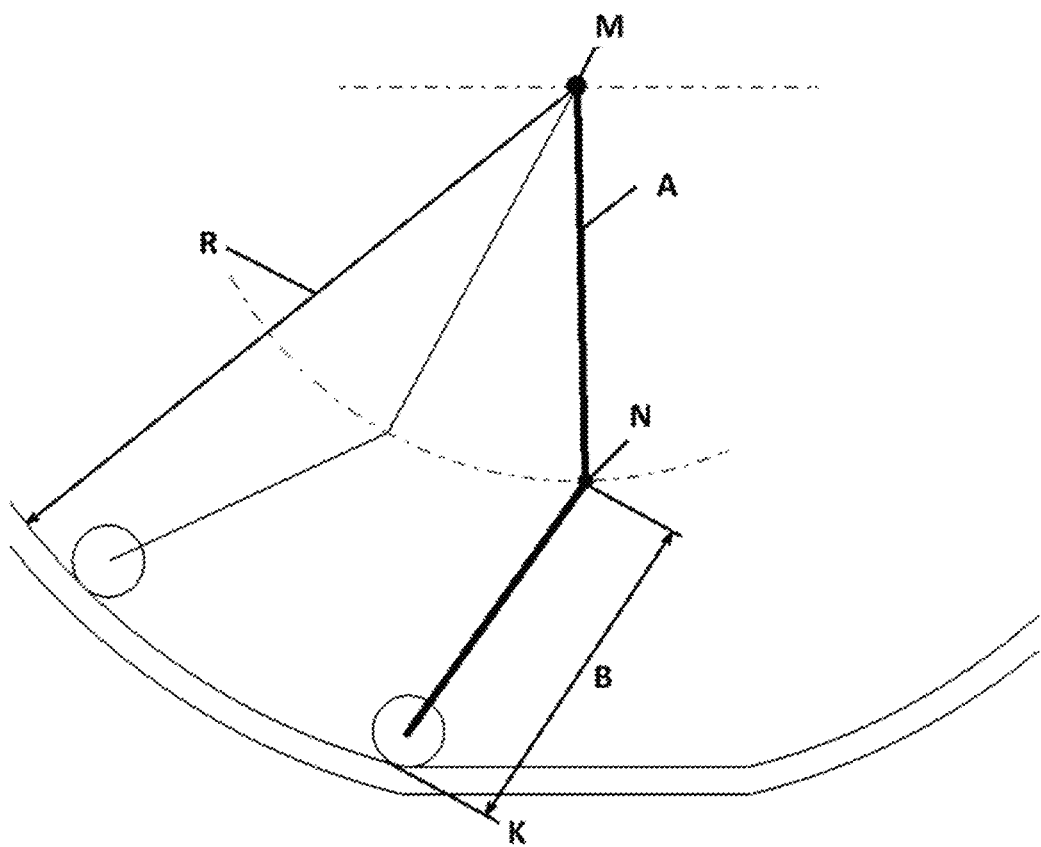
FIG. 11 illustrates the ratios of the distances of the axis of rotation of the lever element N from the wheel centre M and the contact point K.

FIG. 11 illustrates the length A as the distance of the fulcrum of the lever element N from the wheel centre M and the length B as the distance of the fulcrum of the lever element N from the contact point K. The latter is the greatest distance of the contact element from the fulcrum of the lever element N that comes, or can come, into contact with the inside of the wheel tyre.

Figure 12:
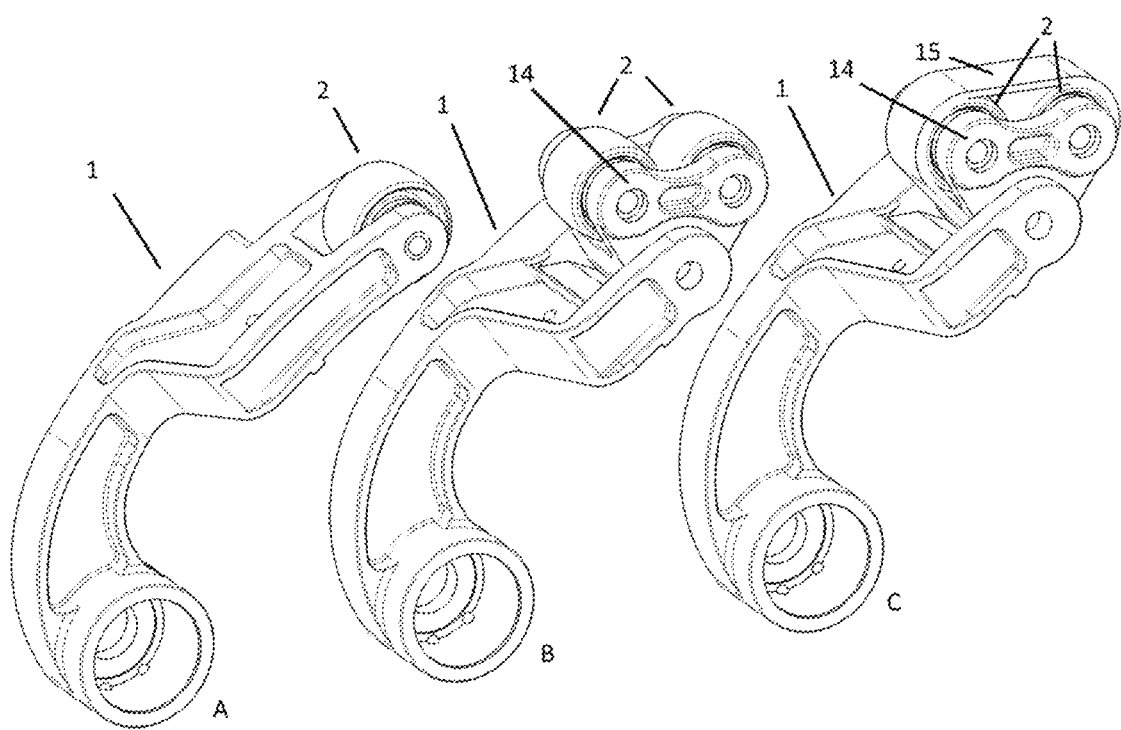
FIG. 12 illustrates three embodiments of a lever element.

FIG. 12 shows detail views of three embodiments of lever elements 1 with contact element(s) 2, in this case designed as a roller. In the embodiment A, the lever element 1 supports a roller as contact element 2. In the embodiment B, the lever element 1 supports a slide 14 (second part), which supports two rollers as contact elements 2. In the embodiment C, the lever element 1 also supports a slide 14 (second part), which supports two rollers as contact elements 2. In the embodiment C, the two rollers as contact elements 2 are surrounded by a belt 15, which is also guided over another roller (not shown) mounted on the slide.

LIST OF REFERENCE NUMERALS

1 Lever element
2 Contact element
3 Freewheel clutch
4 Mechanical coupling element system
5 Coupling element
6 Generator
7 Rim
8 Tyre
9 Lever element shaft
10 Intermediate shaft
11 Planetary gear system
12 Overload protection device
13 Biasing element
14 Slide
15 Belt on contact elements
16 Deflection roller
17 Generator drive shaft
18 Drive roller
19 Planetary gear system ring gear
20 Planetary gear system planet gear
21 Planetary gear system sun gear
22 Planetary gear system carrier
23 Generator rotor
24 Generator stator

The invention claimed is:

1. A converter for obtaining electrical energy in a rolling wheel of a vehicle from a deformation of a wheel tire due to contact with a road surface, comprising
   a) at least four lever elements, which at their first end are rotatably housed, and at their second end are configured to come into contact with an inside of the wheel tire via at least one contact element such that the deformation of the wheel tire due to contact with the road surface causes a rotational movement of a lever element of the at least four lever elements,
   b) a mechanical coupling element system configured for transferring a force occurring due to the rotational movement of the at least four lever elements, and
   c) at least one electrical generator configured to convert the force transferred by the mechanical coupling element system into electrical energy,
   wherein the at least four lever elements are each pivotally mounted at their first end by means of a shaft and the shaft is configured to transmit the force of the rotational movement,
   wherein the mechanical coupling element system per shaft of each lever element has at least two coupling elements, which are each arranged to transmit the force of the rotational movement to the shaft of the adjacent lever element or to an intermediate shaft,
   wherein at least one planetary gear system is present, which is arranged to transmit the rotational movement of a shaft of a lever element or an intermediate shaft to the at least one electrical generator, and
   wherein a sum (A+B) of a distance A of a fulcrum N of a given lever element from a wheel center M and a distance B of the fulcrum N from a contact point K of a contact element with the inside of the wheel tire, in a case of a plurality of contact elements per lever element the contact point with a greatest distance from the fulcrum N, relative to a radius of the inside of the wheel tire R ((A+B)/R)) is in a range from 102% to 110%.

2. The converter according to claim 1, wherein the electrical generator is configured to convert the force transferred by the at least one planetary gear system into electrical energy.

3. The converter according to claim 1, wherein the at least one planetary gear system is arranged to convert the rotational movement of the shaft into a faster rotation that is directed towards the at least one electrical generator.

4. The converter according claim 1, wherein coupling elements in the mechanical coupling element system are arranged to cause a frictional connection of the shafts of the at least four lever elements.

5. The converter according to claim 1, wherein the coupling elements are each arranged in pairs rotationally symmetrically about an axis of rotation of the wheel.

6. The converter according to claim 1, wherein the coupling element comprises a chain or a belt.

7. The converter according to claim 1, wherein the at least four lever elements are arranged rotationally symmetrically about an axis of rotation of the wheel.

8. The converter according to claim 1, wherein the converter has at least two electrical generators arranged rotationally symmetrically about an axis of rotation of the wheel.

9. The converter according to claim 1, wherein the at least four lever elements transfer the force via a freewheel clutch to the shaft.

10. The converter according to claim 1, wherein at the second end of each lever element, the contact element is rotatably housed at the lever element about an axis of rotation such that the contact element establishes contact between the lever element and the wheel tire, and the axis of rotation of the contact element runs substantially parallel to the axis of rotation of the wheel, and the contact element has a substantially rotationally symmetrical shape in respect of rotation about its fulcrum.

11. The converter according to claim 1, wherein the contact element is configured to rotate freely about a fulcrum of the contact element.

12. The converter according to claim 1, wherein the converter comprises a biasing means for the at least four lever elements,
   and wherein the biasing means is configured to bias rotation of the at least four lever elements about their first end with a force in the rotational movement of the at least four lever elements, caused by the deformation of the wheel tire due to contact with the road surface.

13. A system for obtaining electrical energy in a rolling wheel of a vehicle from a deformation of a wheel tire due to contact with a road surface, comprising:
- a converter according to claim 1; and
- a wheel rim configured as a supporting structure.

14. A vehicle wheel comprising a system according to claim 13.

\* \* \* \* \*